July 10, 1956     I. H. PAGE     2,754,506
ECHO DETECTION SYSTEM
Filed Nov. 26, 1946
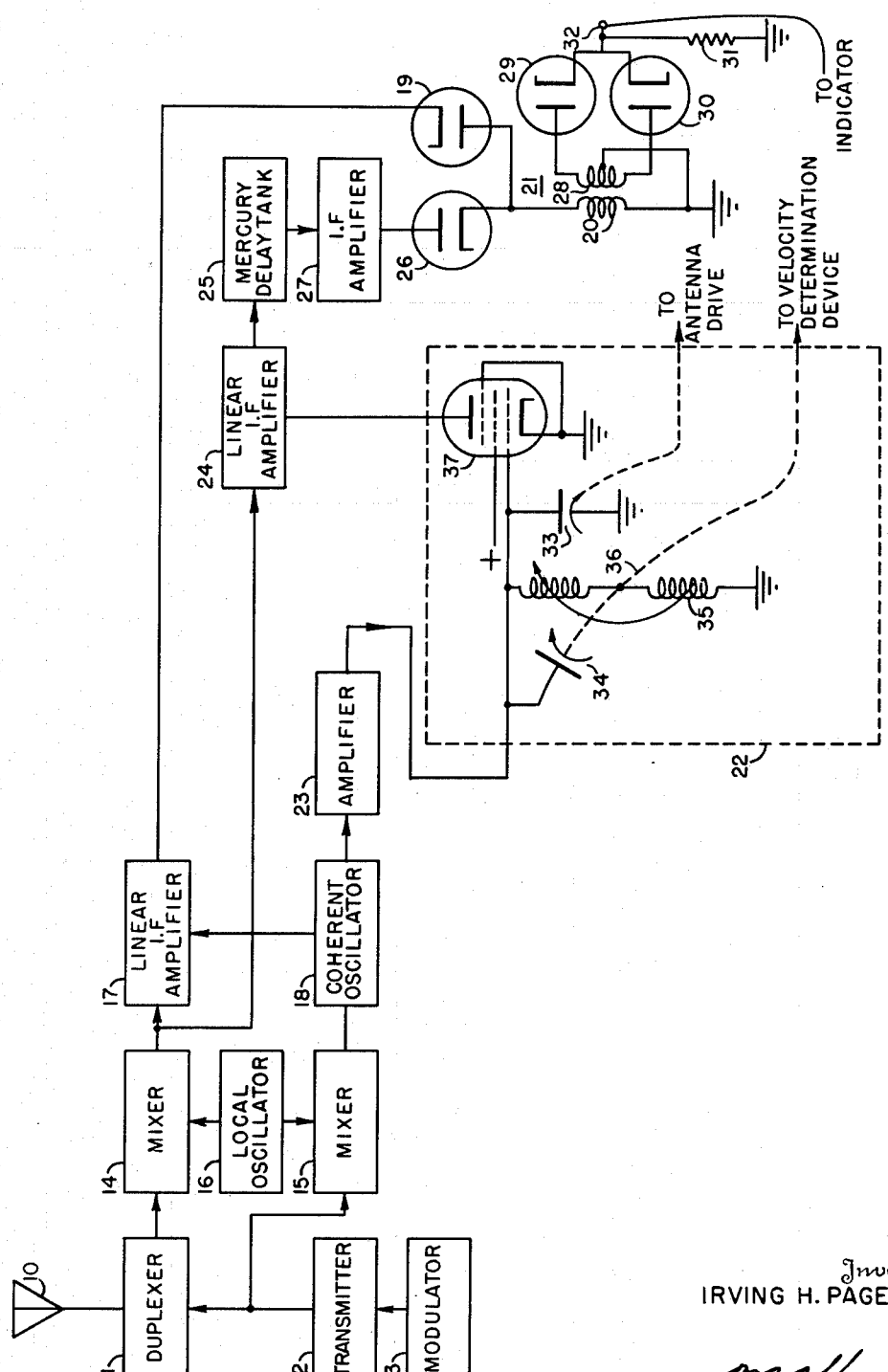
Inventor
IRVING H. PAGE
By M. Hayes
Attorney United States Patent Office 2,754,506
Patented July 10, 1956

2,754,506

ECHO DETECTION SYSTEM

Irving H. Page, Washington, D. C.

Application November 26, 1946, Serial No. 712,334

4 Claims. (Cl. 343—7.7)

(Granted under Title 35, U. S. Code (1952), sec. 266)

This invention relates to echo detection systems for detection of moving target objects; in particular it relates to a method of distinguishing moving target objects from fixed targets despite changes in the position of the echo detection system.

In many of the present forms of moving target detection systems, pulse comparison technique is employed. Its basic principle of operation involves the delay of the echoes from one transmitted pulse by an interval precisely equal to the pulse-repetition period of the transmitter, followed by a direct comparison of the delayed echoes with the echoes from the succeeding transmitted pulse. Echoes returned from fixed target objects will be compared at the same instant and can be made, by proper circuit arrangement, to cancel. However target objects which are subject to changing position between pulses will impose a time-phase difference between successive returning echoes. Comparison of target echoes from moving targets, consequently, will not result in cancellation thereof.

If the position of the echo detection system is continually changing such as is encountered in ship board installations, a unavoidable phase shift of returning echoes will result. Consequently, comparison of successive echoes from fixed targets will not cancel, thus producing a result similar to that caused by successive echoes from moving targets. It is apparent that some means must be incorporated in such echo detection systems which will compensate for any change in position thereof. It is to the solution of this problem that this invention is directed.

An object of this invention is to provide, for an echo detection system whose position is continually changing in space, a method of distinguishing moving target objects from fixed target objects.

Another object of this invention is to provide, for such a system, a means of detecting moving target objects despite the presence of fixed target objects.

A further object of this invention is to provide, for such a system a method of compensating for the changing position of the system.

Other and further objects and features of the present invention will become apparent upon a careful consideration of the following detailed description when taken together with the accompanying drawings which illustrate a typical embodiment of the invention and the manner in which the embodiment may be considered to operate.

Referring to the drawing, an antenna 10 is employed to radiate and receive energy. Antenna 10 is coupled to a duplexer 11. A transmitter 12 for generating power in the form of pulses timed by a modulating device 13, is also coupled to the duplexer. Signals intercepted by antenna 10 are applied to a mixer 14. A part of the output signal from transmitter 12 is coupled into mixer 15.

A regulated oscillator 16, similiar to conventional local oscillators but carefully designed for good frequency stability, is coupled to both mixers 14 and 15. Signals applied to mixer 14 are therein converted to an intermediate frequency, that is, the difference between the frequency of the signals intercepted by antenna 10 and the frequency of the local oscillator 16. The intermediate frequency output from mixer 14 is applied to a linear selective amplifier 17. Output from mixer 15 is applied to an oscillator 18 which is operative at the intermediate frequency. Oscillator 18 is generally known in the art as a coherent oscillator and is denoted on the drawing. A part of the output of oscillator 18 is coupled to linear amplifier 17 wherein it is linearly mixed with signals from mixer 14.

The output of linear amplifier 17, being the vector sum of the voltages from mixer 14 and coherent oscillator 18, is rectified by diode 19 and applied to primary winding 20 of pulse transformer 21. A part of the voltage output of coherent oscillator 18 is applied to phase alteration network 22 after amplification by a suitable amplifier 23. Phase shifting network 22 introduces a phase alteration in the signals from amplifier 23 to compensate for any change in position of the echo detection system between transmitted energy pulses. The compensated voltage signals from network 22 are mixed in amplifier 24 with intermediate frequency signals from mixer 14. The output signals from amplifier 24, being the vector sum of the voltage from mixer 14 and the phase compensated voltage from coherent oscillator 18, are impressed on a mercury delay tank 25. Voltage signals applied to delay tank 25 are time delayed by an amount precisely equal to the pulse repetition frequency of the energy radiated by antenna 10. The delayed energy output from delay tank 25 is rectified in diode 26, following amplification in amplifier 27, and then applied to primary winding 20 of pulse transformer 21. The amplification of amplifier 27 is selected such that successive echo pulses reflected from fixed target objects will result in output voltages of equal magnitude from linear amplifier 17 and amplifier 27. Diodes 19 and 26 are connected to give output voltages of opposite polarity; that is, in this embodiment diode 19 is connected to deliver negative output signals to the primary of transformer 21 while diode 26 is connected to deliver positive signals to winding 20.

The secondary winding 28 of pulse transformer 21 has a center tap which is grounded. The terminals of winding 28 are connected to the plates of a second pair of diodes 29, 30 for full wave rectification. The cathodes of diodes 29 and 30 have a common resistance path for the full wave rectification. An output terminal 32 provides output signals from the cathodes of diodes 29 and 30. The output voltage appearing at terminal 32 may be applied to a suitable utilization device such as a cathode ray indicator not shown.

Referring again to the phase alteration network 22, a variable capacitance 33, driven in synchronism with the motion of antenna 10, applies a correction to signals applied to network 22 in accordance with the direction of relative motion of the echo detection system. A variable capacitance 34 and a variable inductive device 35 adjustable by means of a single tuning drive 36 affords means of compensating signals applied to network 22 in accordance with the rate of change of the position of the echo detection system. In practice the tuning drive 36 may be either mechanically linked to the pointer of the ship's speed indicator and driven thereby as indicated by the dotted line and legending in the drawing, or alternatively it may be manually adjusted in accordance with the ship's speed by an operator. Amplifier 37 couples the compensated signals from phase alteration network 22 to the linear amplifier 24.

A detailed description of the operation of the particular embodiment of the invention shown in the drawing will now be made. The coherent oscillator 18 is a continuous wave oscillator operating at the intermediate frequency and in operation is locked into a reference phase condition by each transmitted pulse signal. The required shock excitation at the intermediate frequency is provided by mixer 15, wherein the local oscillator 16 and transmitted pulse signals are mixed to produce a very strong I. F. driving voltage. This strong signal, applied to the oscillator 18, forces oscillator 18 into reference phase relation to it. Once selected phase relationship is established, oscillator 18 continues phased oscillation until the next transmitted pulse.

The continuous wave signals from coherent oscillator 18 are mixed with the returning echo signals in amplifier 17. Since the voltage from oscillator 18 has phase coherence at all times as established by the transmitted pulse energy, the vector sum voltage from the oscillator 18 and the voltage produced by an echo will be identical from one echo signal to the next so long as the range of the object causing the reflection is not changed in the intervening time. As a result the voltage waveforms at the output of amplifier 17 as produced by echoes from constant range objects will be identical from transmitted pulse to transmitted pulse. Echo signals from target objects whose range is changing will not return and mix with the voltage from oscillator 18 in constant phase because the total length of the echo path will change from pulse to pulse. Consequently the output from amplifier 17 will be variable from pulse to pulse for echoes from target objects whose range from antenna 10 is changing.

It should be noted that a change of position of the echo detection system between successive transmitted energy pulses will produce a result similar to that of a position change of a target object. For this reason a correction must be made to successive pulses to correct for a change of position of the echo detection system occurring during the time intervals between the successive pulses. Accordingly, a portion of the output of coherent oscillator 18 is applied to phase shifting network 22. Variable capacitance 33 is synchronized with the antenna 10 to produce a variation in capacitance 33 in accordance with the antenna orientation with respect to the direction of antenna motion. Variable capacitance 34 and variable inductive device 35, adjustable by means of a single tuning device 36, are operated by a suitable velocity measuring device adapted to accurately measure the rate of changing position of the echo detection system.

Adjustment of capacitance 34 and inductive device 35 varies the ratio of capacitance 34 to capacitance 33 while maintaining the resonant frequency of the associated grid circuit of tube 37. Thus the effect of variable capacitance 33 may be controlled in accordance with the rate of change of position of the echo detection system. Adjustment of capacitance 33 in accordance with the rotation rate of antenna 10 compensates signals impressed on the alteration phase network 22 in such a way as to apply a phase alteration in a specific direction when the direction of orientation of the antenna beam is in the direction of motion of the platform mounting the echo detection system, and an opposite phase alteration when the direction of motion of the platform is away from the direction of orientation of the antenna beam. In accordance with the above discussion the phase alteration network 22 compensates the signals from the coherent oscillator 18 in accordance with the relative rate and direction of changing position of the echo detection system. The phase-compensated signals from network 22 are linearily mixed with echo-pulses from mixer 14 in amplifier 24. The output of amplifier 24 will be the vector sum of the voltage from mixer 14 and the compensated coherent oscillator voltage from network 22.

The voltage output from linear amplifier 17 is applied directly to pulse transformer 21 through diode rectifier 19. The voltage output from linear amplifier 24 is applied after a time-delay of one pulse-repetition-period to pulse transformer 21 through oppositely-connected diode rectifier 26. The effect of this procedure is to compare the echoes following one transmitted pulse with the echoes following the next, and to apply them in opposite polarity to pulse transformer 21. Echoes from fixed target objects will be identical from pulse to pulse and thus will cancel one another and produce no net result in transformer 21. On the other hand, echoes from target objects whose position is changing will not possess phase or amplitude uniformity from one pulse to the next and will, therefore, not cancel in transformer 21. Such non-uniform echo signals will induce voltage pulses in the secondary winding of transformer 21. The induced voltage pulses are rectified by diodes 29 and 30 and may be applied to a cathode ray indicator as in a conventional echo-ranging system.

From the foregoing discussion it is apparent that considerable modification of the features of this invention is possible, and while the device herein described and the form of apparatus for the operation thereof constitutes a preferred embodiment of the invention it is to be understood that the invention is not limited to this precise device and form of apparatus and that changes may be made therein without departing from the scope of the invention which is defined in the appended claims.

The invention described herein may be manufactured and used by or for the government of the United States of America for governmental purposes without the payment of any royalties thereon or therefor.

What is claimed is:

1. In an echo detection system whose position is subject to continual change in space, in combination, a transmitter operative when triggered to transmit a pulse of radio energy, receiver means operative to receive echoes of the transmitted pulses returned by remote objects, adjustable phase shifting means operable to shift the phase of the received pulses of energy in time phasing to compensate for the changing position of the echo detection system, and sensing means to determine the phasing of successive return energy pulses from each remote object so as to generate a signal only when a difference in phase exists between successive signals to indicate the presence of moving objects.

2. In an echo detection system whose position is subject to continual change in space, a transmitter operative to transmit repetitive pulses of electrical energy in a selected direction, receiver means operative to receive echoes of the transmitted pulses returned by remote objects, an adjustable phase shifting network operative to vary the phasing of the return energy in accordance with the changing position of said echo detection system, said network including an inductance-capacitance tuned circuit, means varying the tuned frequency thereof in dependency on the direction of changing position of said echo detection system relative to the selected direction of energy transmission, and means altering the amount of variation of said tuned frequency in dependency on the rate of motion of said echo detection system; and sensing means coupled to the output of said network for determining the phase difference between successive return energy signals caused by motion of the remote energy return object.

3. In a pulse echo moving object detection system whose position in space is subject to change; the combination of, a pulse transmitter operable to emit recurrent energy pulses, a receiver for receiving said pulses after reflection thereof from remote objects, means dividing said received energy pulses into two transmission paths, means coupled to the outputs of said paths for comparing the phase of the received energy appearing therein, one of said paths including a delay network for delaying the received energy applied thereto by one complete transmission cycle whereby the phase of the echo signal reflected from any given object and due to one transmitted pulse is compared with the echo signal from the same object and due to the next successive transmitted pulse, and an adjustable phase shifting network coupled to one of said paths for shifting the phase of the received energy appearing therein to compensate for the changing position of the pulse echo system.

4. A system as set forth in claim 3 wherein the phase shifting network includes an inductance-capacitance tuned circuit with means for varying the tuned frequency thereof in dependency on the direction of changing position of said echo detection system, and means for altering the amount of variation of said tuned frequency in dependency on the rate of motion of said echo detection system.

References Cited in the file of this patent

UNITED STATES PATENTS

| | | |
|---|---|---|
| 2,535,274 | Dicke | Dec. 26, 1950 |
| 2,548,779 | Emslie | Apr. 10, 1951 |